Jan. 16, 1962 E. J. McGRATH 3,017,007
CONVEYOR MECHANISM
Filed July 10, 1958 5 Sheets-Sheet 2
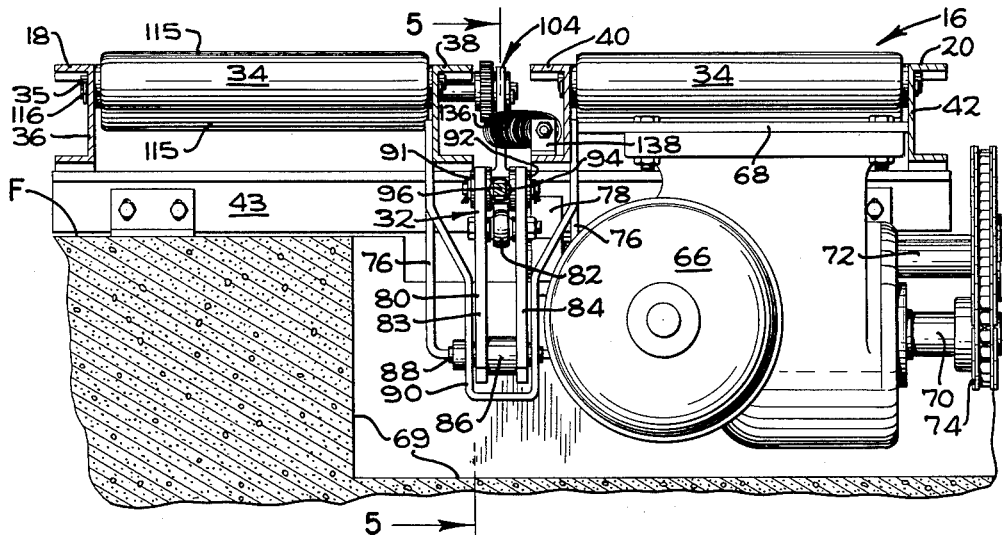
FIG_4
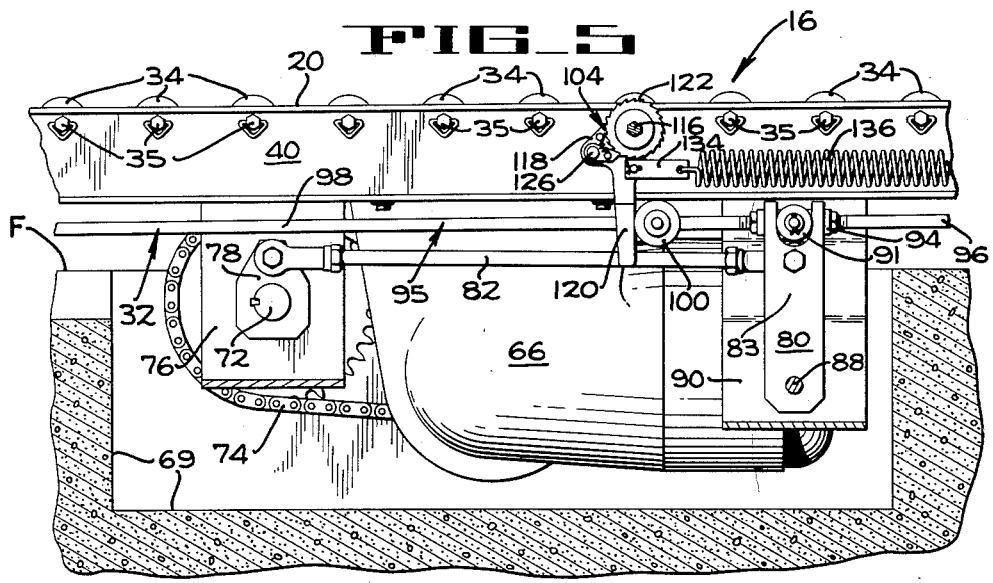
FIG_5
INVENTOR
EARLE J. MC GRATH
BY Hans G. Hoffmeister
ATTORNEY Jan. 16, 1962
E. J. McGRATH
3,017,007
CONVEYOR MECHANISM
Filed July 10, 1958
5 Sheets-Sheet 3
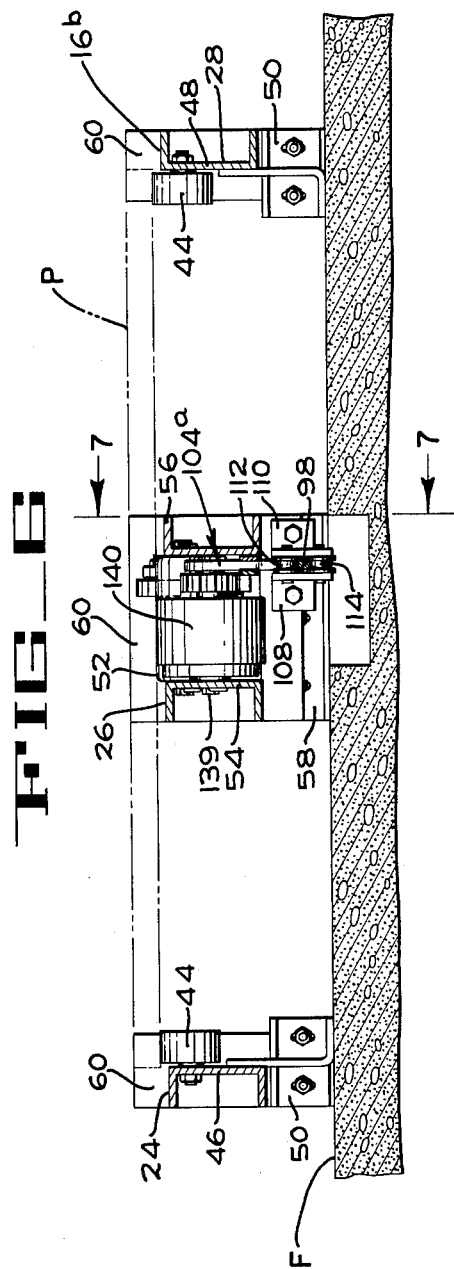
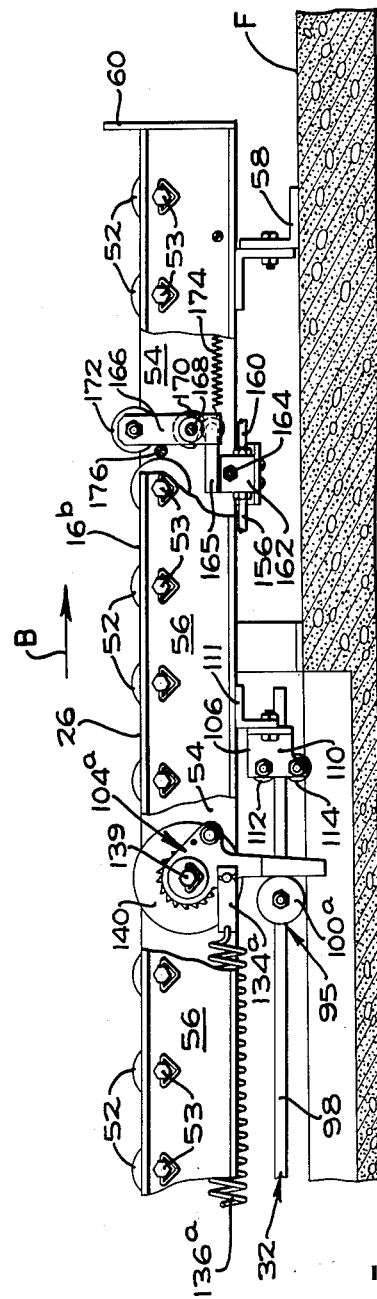
INVENTOR
EARLE J. MC GRATH
BY Hans G. Hoffmeister
ATTORNEY

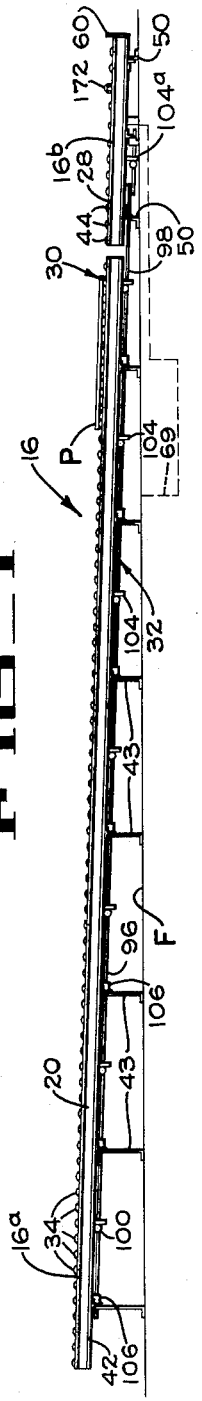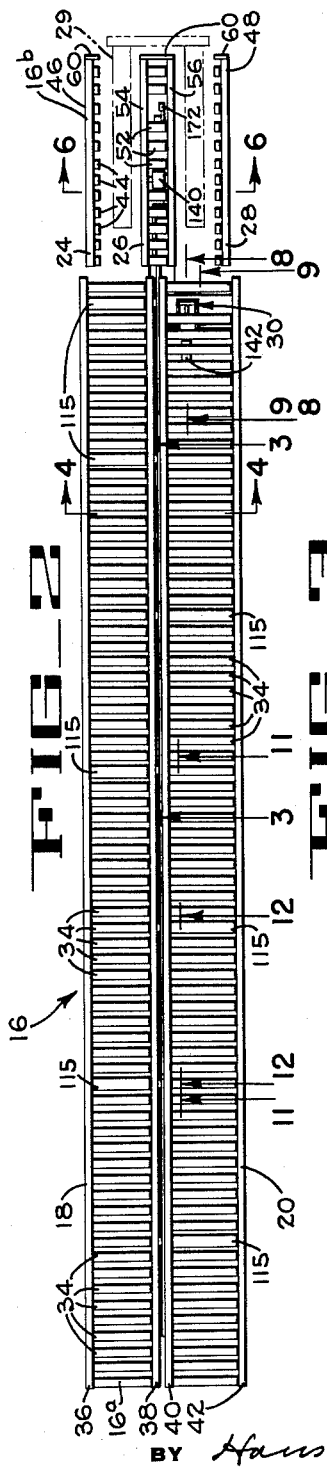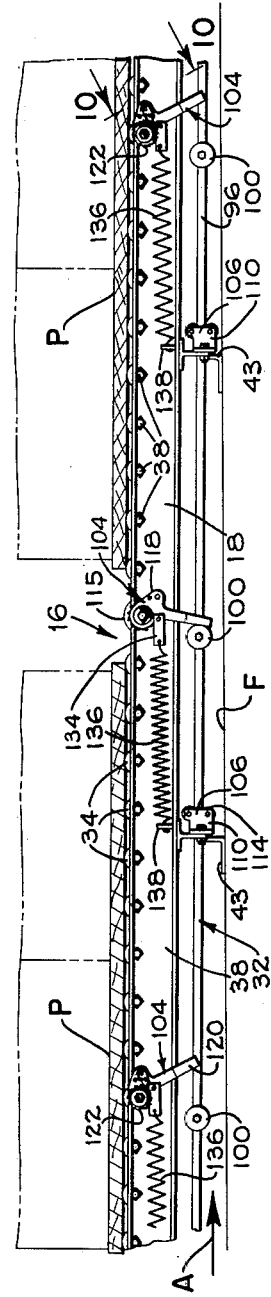
INVENTOR
EARLE J. MC GRATH
ATTORNEY

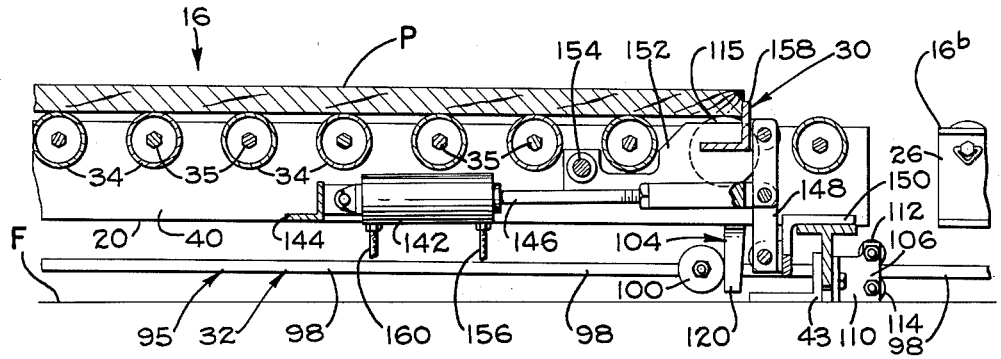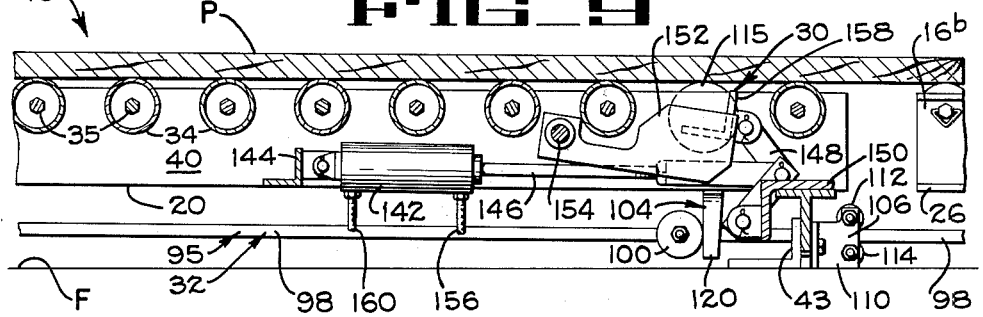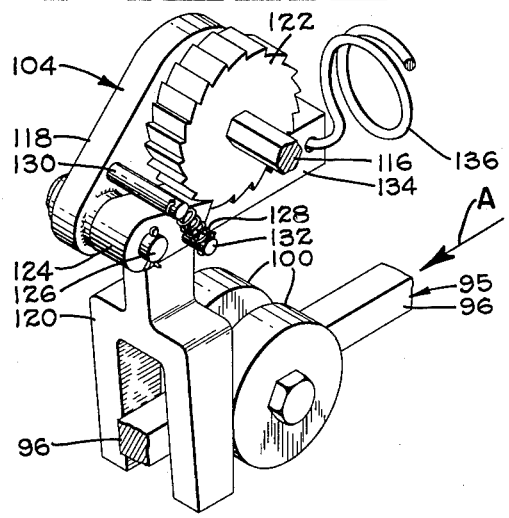

Jan. 16, 1962     E. J. McGRATH     3,017,007
CONVEYOR MECHANISM
Filed July 10, 1958     5 Sheets-Sheet 5
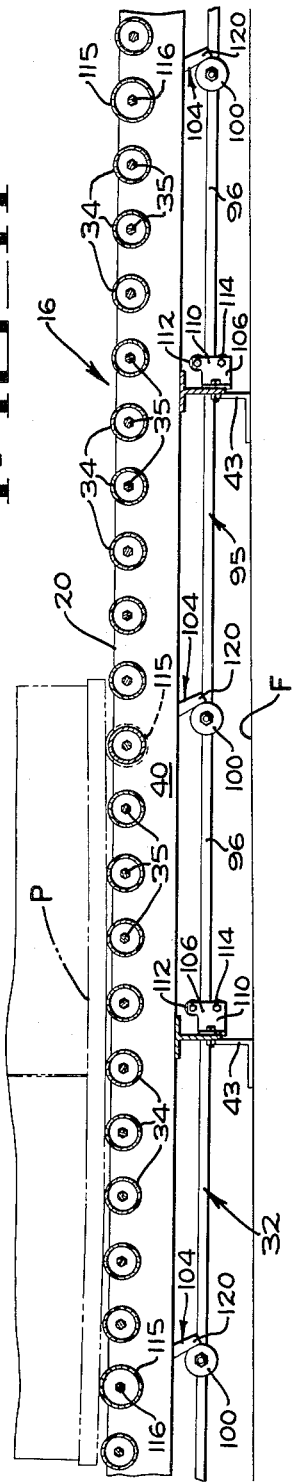
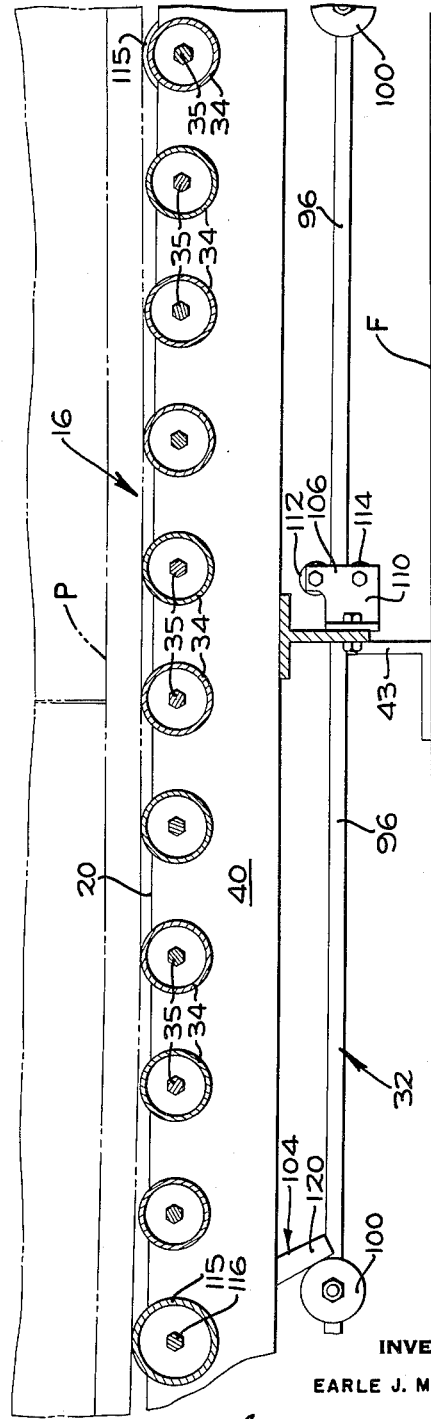
INVENTOR
EARLE J. MC GRATH
BY Hans G. Hoffmeister
ATTORNEY

United States Patent Office 3,017,007
Patented Jan. 16, 1962

3,017,007
CONVEYOR MECHANISM
Earle J. McGrath, San Bernardino, Calif., assignor to FMC Corporation, a corporation of Delaware
Filed July 10, 1958, Ser. No. 747,762
21 Claims. (Cl. 193—40)

The present invention appertains to article conveyors and more particularly relates to an improved gravity roller conveyor.

In certain material handling installations, such as warehousing systems, it is necessary to convey quantities of articles into a storage area and retain them temporarily at a holding station until they are sorted, classified and stored. To minimize the handling of the articles, it is desirable that the temporary holding of the articles be carried out on the same conveyor that brings the articles into the storage area. Such a holding conveyor must be capable of bringing articles into the area and retaining them in stationary position at a holding zone, defined by the discharge end of the conveyor, while continuing to bring additional articles into the storage area and advancing them toward the holding zone.

Gravity roller conveyors have been proposed for use as holding conveyors. However, on such conveyors the incoming load advances in an uncontrolled manner toward the discharge end with the result that the incoming load collides with a fixed stop or with another load retained in the holding zone. Such collisions cause damage to both the containers and the articles therein.

Accordingly, an object of the present invention is to provide an improved holding conveyor.

Another object is to provide an improved gravity roller conveyor.

Another object is to provide a conveyor having the low power requirements of a gravity roller conveyor and the ability of a driven conveyor to maintain control of the object being conveyed.

Another object is to provide an improved drive mechanism for a conveyor.

Another object is to provide an improved conveyor driving mechanism having a plurality of driving devices each of which will automatically disconnect itself from the source of power when the forward movement of the pallet which it is driving is stopped.

These and other objects and advantages of the present invention will become apparent from the following description and the accompanying drawings, in which:

FIG. 1 is a side elevation of the conveyor of the present invention.

FIG. 2 is a plan of the conveyor of FIGURE 1.

FIGURE 3 is an enlarged vertical section taken along lines 3—3 of FIGURE 2.

FIGURE 4 is an enlarged vertical section taken along lines 4—4 of FIGURE 2.

FIG. 5 is a vertical section taken along lines 5—5 of FIGURE 4.

FIG. 6 is an enlarged vertical section taken along lines 6—6 of FIGURE 2.

FIG. 7 is a vertical section taken along lines 7—7 of FIGURE 6, certain parts being broken away.

FIG. 8 is an enlarged section taken along lines 8—8 of FIGURE 2 showing a pallet stop in pallet stopping position.

FIG. 9 is an enlarged section taken along lines 9—9 of FIGURE 2 showing the pallet stop of FIGURE 8 in pallet releasing position.

FIG. 10 is an enlarged perspective taken in the general direction indicated by the arrows 10—10 of FIGURE 3.

FIG. 11 is an enlarged section taken along lines 11—11 of FIGURE 2 showing a pallet straddling two adjacent drive rollers.

FIG. 12 is an enlarged section taken along lines 12—12 of FIGURE 2, particularly showing that the top surfaces of certain rollers of the conveyor are at a higher elevation than other rollers.

The pallet conveyor 16 of the present invention (FIGS. 1 and 2) comprises a pair of spaced, parallel roller conveyors 18 and 20 which are inclined downwardly from an elevated end 16a, at which loaded pallets are received, toward a pallet unloading section 16b. The pallet unloading section 16b comprises three parallel conveying sections 24, 26 and 28 which are also inclined and are laterally spaced to permit the forks of a lift truck 29, indicated in phantom lines in FIG. 2, to be moved therebetween to remove loaded pallets P from the conveyor. A retractable pallet stop 30, adjacent the lower end of the conveyor 20, is arranged to allow only one pallet at a time to enter the unloading section 16b. A pallet drive mechanism 32 is arranged to move the pallets P from one end of the conveyor 16 to the other, and cooperates with the stop 30 to move pallets one at a time into the unloading section 16b.

When the conveyor 16 is used as a holding conveyor, loaded pallets are received at the elevated end 16a and are carried down the conveyor to the unloading section 16b. One loaded pallet is moved past stop 30 into the unloading section 16b where it is held. The next loaded pallet comes to rest against stop 30, and each following pallet is moved into abutting contact with the preceding pallet. Thus, the discharge end and a substantial portion of the conveyor 16 and at times the entire conveyor form a holding zone.

Each of the roller conveyors 18 and 20 comprises a plurality of spaced rollers 34 (FIGS. 2 and 4) journalled on shafts 35. The shafts 35 of the conveyor 18 are disposed between and are supported by channel members 36 and 38, and the shafts 35 of conveyor 20 are supported between channel members 40 and 42. A plurality of pedestals 43 (FIG. 1) of different heights are secured to the channel members 36, 38, 40 and 42 to support the conveyors 18 and 20 in their inclined attitude.

Each of the outer conveyor sections 24 and 28 (FIGS. 2 and 6) of the unloading section 16b comprises a plurality of rollers or skate wheels 44 journalled on channel members 46 and 48, which channels are supported in an inclined position by pedestals 50. The central conveying section 26 comprises a plurality of rollers 52 journalled on shafts 53 mounted on and disposed between channel members 54 and 56, which are supported in an inclined position by pedestals 58. Pallet stopping plates 60 (FIG. 2) are welded to the lower end of the channels 46, 48, 54 and 56.

As has been mentioned previously, the roller conveyors 18 and 20 and the conveying sections 24, 26 and 28 are inclined, but are not inclined enough for the force of gravity alone to maintain movement of the pallets P downwardly along the conveyor 16. The angle of inclination of the conveyors is slightly less than the angle that would permit the load being handled to move by gravity toward the discharge end. In one installation, where pallets loaded with containers of eggs are handled, a slope corresponding to a drop of approximately one foot in one hundred and twenty-five feet of conveyor length has been found suitable for the conveyor 16. The pallet drive mechanism 32 is designed to engage the undersurface of the pallets P and start the pallets moving along the conveyor 16 with a very small expenditure of power. Since the conveyors are at an inclination close to that which would cause gravity movement of the pallets, it is apparent that the rollers will assist the drive mechanism in moving the pallets downwardly along the conveyor. It can be seen, therefore, that movement of the pallets is a result of the force of gravity tending to roll the pallets down the inclined conveyor 16 combined with the force exerted by the drive mechanism 32.

The pallet drive mechanism 32 comprises a motor 66 (FIGS. 4 and 5) which is bolted to a mounting bracket 68 secured to the channel members 40 and 42 of the roller conveyor 20. The motor 66 is disposed in a pit 69 in the floor F which supports the conveyor 16. The motor output shaft 70 (FIG. 4) is connected to a laterally extending crank shaft 72 by a chain drive 74. The crank shaft 72 is journalled for rotation in a bracket 76 (FIG. 5) which is secured to the channel members 38 and 40. A crank 78 is keyed to the crank shaft 72 and is operatively connected to a yoke 80 by a connecting rod 82. The yoke 80 comprises two parallel arms 83 and 84 welded to a spacing collar 86 which is mounted for pivotal movement on a pin 88. The pin 88 is suitably secured to a bracket 90 which is rigidly secured to the channel members 38 and 40. With this arrangement, the motor 66 drives the crank shaft 72 which, in turn, causes the yoke 80 to oscillate about the pin 88.

The arms 83 and 84 of the yoke 80 (FIG. 4) have forked upper ends arranged to receive rollers 91 and 92, respectively, that are mounted for rotation on a coupling member 94 (FIG. 5) of a drive rod assembly 95. A longitudinally extending drive rod 96 of the assembly 95 is of square cross section and is bolted to and projects outwardly from one end of the coupling member 94. A similar but shorter drive rod 98 of the assembly 95 is bolted to and extends outwardly in the opposite direction from the coupling member 94. The rod 98 extends forwardly toward the discharge end of the conveyor and is associated with the conveying section 26 (FIG. 7) of the pallet unloading section 16b and with the lower end portion of the conveyors 18 and 20, while the rod 96 extends toward the upper load-receiving end of the conveyor 16. When the yoke 80 is oscillated, the drive rod assembly 95 is reciprocated longitudinally of the conveyor 16.

Pairs of rollers 100 (FIG. 10) of the assembly 95, are mounted for rotation on the reciprocable rods 96 and 98 at predetermined spaced intervals. Each pair of rollers 100 actuates a roll driving unit 104 which will be described in detail presently. The drive rods 96 and 98 are guided for reciprocating movement by a plurality of longitudinally spaced guiding devices 106 (FIG. 6 and 7). Each guiding device 106 comprises a pair of spaced angle members 108 and 110 which are bolted to the pedestals 43 (FIG. 3), or to an angle member 111 (FIG. 7) which is secured to the conveying section 26. The angle members 108 and 110 prevent horizontal lateral movement of the rods 96 and 98. Rollers 112 and 114 are disposed between and journalled on the angle members 108 and 110 with the roller 112 disposed above its associated rod 96 or 98 and with the roller 114 disposed below its associated rod 96 or 98 thereby preventing vertical movement of the rods 96 or 98.

The roller driving units 104 (FIG. 3) are evenly spaced longitudinally of the roller conveyors 18 and 20 and are arranged so that one drive unit 104 drives a roller 115 on the conveyor 18 (FIG. 2) while the next unit 104 drives a roller 115 on the conveyor 20. The spacing of the rollers 115 is such that each pallet P is always in contact with at least one of the drive rollers 115. In FIGURES 11 and 12, a pallet P is shown straddling two of the drive rollers 115. These rollers 115 are identical to the rollers 34 except that the rollers 115 are slightly larger in diameter than the rollers 34 and keyed to shafts 116. The shafts 116 are longer than the shafts 35 and are mounted for rotation on their associated channel members 36, 38 or 40, 42. The shafts 116 are mounted in such a way that the upper surfaces of the driving rollers 115 are disposed at a level that is a minimum of $\frac{1}{32}$ of an inch above the level of the upper surfaces of the rollers 34, and may be as much as $\frac{1}{16}$ of an inch above the level of the rollers 34. With this arrangement the pallet will always be in frictional engagement with the drive rollers 115.

As best shown in FIGURE 10, each roller driving unit 104 comprises a crank member 118 rotatably mounted on the shaft 116 and having a yoke 120 on its lower end arranged to straddle its associated drive rod 96 or 98 in position to be contacted and pivoted by the rollers 100. A ratchet wheel 122 is locked on the shaft 116, and a pawl 124 is pivotally mounted on a pin 126 which is secured to the crank member 118. The pawl 124 is urged into engagement with the ratchet wheel 122 by a spring 128 which is connected between pins 130 and 132 secured on the crank member 118 and pawl 124, respectively. A connecting link 134 is pivotally connected to the crank member 118, and a drive spring 136 is connected between the link 134 and a tab 138 (FIG. 3) welded to the fixed channel 38. Movement of the drive rods 96 and 98 in the direction of the arrow A (FIGS. 3 and 10) will cause the rollers 100 to contact the yoke 120 and move the same to the position indicated by the drive unit 104 at the far right in FIGURE 3, thereby tensioning the spring 136 and causing the pawl 124 to ride over the ratchet wheel 122. When the drive rod is moved in the opposite direction, the spring 136 pivots the yoke 120 in an opposite direction, causing the pawl to drive the ratchet wheel and the associated drive roller 115 in a clockwise direction, as viewed in FIGURE 3, thereby returning the devices 104 to the position illustrated by the middle driving unit 104 shown in FIGURE 3. In this way the pallets are intermittently moved along the conveyor by the drive rollers 115 in increments of approximately two inches for each oscillation of the cranks 118. After the pallets have been stopped by the stop 30, the drive rollers 115 that are in contact with the pallets will remain in the spring tensioning position, shown by the drive unit 104 at the far right in FIGURE 3, due to the weight of the loaded pallet. It will be noted that no power is used by the driving units 104 when the drive rollers 115 associated therewith frictionally engage pallets P which are held from movement on the conveyor 16 by the stop 30, because the yokes of such units remain in their power exerting position.

In order to provide a space between a pallet entering the pallet unloading section 16b (FIG. 2) and the adjacent following pallet, a driving unit 104a (FIGS. 6 and 7), which is identical to the driving unit 104, is actuated by rollers 100a on the rod 98. The unit 104a, which includes a ratchet drive mechanism of the same construction as shown in FIG. 10, is mounted on a shaft 139 on which a roller 140 is fixed which is considerably larger in diameter than the drive rollers 115. The unit 104a cooperates with the roller 140 in the same way the drive unit 104 cooperates with the roller 115 with the exception that the larger diameter roller 140 causes the pallet in contact therewith to move faster and hence become spaced from the following pallet. To obtain this faster advancement of the pallet at the unloading section the drive spring 136a must be stronger than one of the springs 136.

The aforementioned pallet stop 30 (FIGS. 8 and 9) is provided in order to allow only one pallet at a time to enter the pallet unloading section 16b. The pallet stop 30 includes a double acting air cylinder 142 which is pivotally mounted on an angle member 144 welded to and extending between the channel members 40 and 42 (FIG. 2). The piston rod 146 (FIG. 9) of the cylinder 142 is pivotally connected to a toggle linkage 148. One end of the linkage 148 is pivotally connected to an angle bracket 150 which is secured to the pedestal 43 shown in FIGURES 8 and 9. The other end of the toggle linkage 148 is pivotally connected to a stop element 152 which is pivotally mounted on a shaft 154 secured to and extending between the channels 40 and 42. When compressed air enters the cylinder 142 through a conduit 156, the piston rod 146 is moved to the left (FIG. 8) and the toggle linkage 148 moves a pallet contacting angle member 158 of the stop element 152 into the path of movement of pallets P moving on the roller conveyors 18 and 20. When compressed air enters the cylinder 142 through a conduit 160, the piston rod 146 is extended and the pallet contacting member 158 is moved below the path of pallets traveling on the conveyors 18 and 20 as clearly shown in FIGURE 9.

The conduits 156 and 160 are connected to an air valve 162 (FIG. 7) which is connected to a supply of compressed air by a conduit 164. The valve 162 is provided with an actuating element 165 which, when positioned as shown in FIGURE 7, causes air to be directed through the conduit 160 thereby moving the pallet contacting angle member 158 (FIG. 9) to a position below the path of movement of the pallet P. A valve actuating lever 166 (FIG. 7) is pivotally mounted on a shaft 168 which is mounted on and extends between the channel members 54 and 56 of the conveying section 26. A cam 170 is welded to the lever 166, and a roller 172 is mounted for rotation on the upper end of the lever 166. The roller 172 is arranged to project into the path of movement of a pallet carried by the conveying section 26. A spring 174 is connected to the lever 166 below the pivot shaft 168 and to the channel member 56 to urge the lever 166 into an upright position so that the roller 172 can be contacted by a pallet. A rod 176, secured to and disposed between the channel members 54 and 56, prevents excessive counterclockwise pivotal movement of the lever 166. When a pallet is conveyed in the direction of arrow B (FIG. 7) into the pallet unloading section 16b, the pallet contacts and rolls over the roller 172, thereby pivoting the lever 166 downwardly, causing the cam 170 to actuate the element 165 of the valve 162 in such a way that air is prevented from flowing into the conduit 160, but is directed into the conduit 156 causing the actuating element 146 (FIG. 8) of the air cylinder 142 to move to the left (FIG. 8). The angle member 158 is thereby moved into the path of movement of the pallets P to prevent another pallet from entering the unloading section 16b before the pallet therein is removed. After a pallet on the unloading section has been removed, the lever 166 is raised by the spring 174 to the position shown in FIGURE 7 causing the valve 162 to direct air through the conduit 160, thereby moving the pallet contacting stop member 158 (FIG. 9) to a position below the pallet P, permitting the same to be advanced into the unloading section 16b.

Although the operation has been included with the description of the different parts of the pallet conveyor 16, a résumé of the operation of the entire conveyor mechanism is given hereinbelow.

At the beginning of the operation, before loaded pallets have been placed on conveyor 16, the motor 66 (FIG. 5) is placed into continuous operation, the valve actuating lever 166 (FIG. 7) is held in upright position in the path of movement of pallets by the spring 174, and the pallet contacting stop member 158 (FIG. 9) is held below the path of movement of pallets. The drive rods 96 and 98 (FIG. 5) are continuously reciprocated by the motor 66, causing all the roller driving units 104 and 104a (FIG. 1) to drive their associated rollers 115 and 140 several degrees for each reciprocation of the rods 96 and 98. It is to be noted that maximum power is required by the motor 66 when the conveyor 16 is empty or when all pallets on the conveyor are moving since, under these conditions, each spring 136 (FIG. 3) and 136a (FIG. 7) must be stretched during the power or spring tensioning stroke of the drive rods 96 and 98.

When pallets are placed on the roller conveyors 18 and 20 (FIG. 2) they are advanced by the combined action of gravity and the intermittently driven drive rollers 115 toward the discharge end of the conveyors 18 and 20. The leading pallet is conveyed past the stop 30 and is spaced from the adjacent following pallet by the action of the large diameter high speed roller 140. The leading pallet then contacts and rides over the roller 172 of lever 166 thereby actuating the air valve 162 (FIG. 7) and directing air into the cylinder 142 (FIG. 8) through the conduit 156 causing the pallet contacting member 158 of the stop 30 to be raised into the path of movement of the following pallet to prevent its movement therepast. The leading pallet is stopped by the pallet stopping plates 60 (FIG. 2) at the end of the pallet unloading section 16b.

It is to be particularly noted that, when all pallets on the conveyor 16 have been stopped, no additional power is used by the drive rollers 115 and 140 that are in contact with the pallets since the drive springs 136 (FIG. 3) and 136a (FIG. 7) remain stretched until the pallets are again free to move.

After a pallet has been removed from the pallet unloading section 16b (FIG. 2), the spring 174 (FIG. 7) pivots the valve actuating lever to the position shown in FIGURE 7, thereby actuating the air valve 162 and causing air to flow through the conduit 160 (FIG. 9) into the cylinder 142 to lower the pallet contacting member 158 of the stop 30. The above-described operation is then repeated, in turn, for all the other pallets as they enter the unloading section 16b.

It is apparent from the foregoing description that the pallet conveyor of the present invention combines the advantages of a gravity flow roller conveyor and a power driven conveyor. Little power is required by the roller driving units 104 and 104a to move the pallets on the conveyor 16, and no power is required by the drive units when the conveyor is completely loaded with pallets and the pallets are not moving. The upper surfaces of the drive rollers are disposed at a slightly higher elevation than are the other rollers of the conveyor in order to assure positive frictional engagement between the drive rollers and the pallets.

Although the conveyor of the present invention has been described as a pallet conveyor, it is apparent that other articles, such as boxes or cartons, can also be handled by the present conveyor.

While one embodiment of the present invention has been shown and described, it will be understood that various changes and modifications may be made without departing from the spirit of the invention or scope of the appended claims.

Having thus described the present invention and the manner in which the same is to be used, what I claim as new and desire to protect by Letters Patent is:

1. A conveyor for transporting articles comprising a frame, a plurality of drive rollers journaled in longitudinally spaced relation along said frame, idle rollers freely journaled in a longitudinally spaced relation along said frame and disposed intermediate said drive rollers, the peripheries of said driving rollers being slightly elevated above the peripheries of said idle rollers, the elevation of said driving rollers above said idle rollers being such that at least one of said drive rollers is in partially supporting friction driving engagement with an article being transported by said conveyor even though the article may also be partially supported by intermediate idle rollers, drive means to turn said drive rollers intermittently to advance the articles along said conveyor, said drive means including an impositively actuated intermittent drive that is ineffective to turn the associated drive roller when the roller is frictionally held against turning by an article resting thereon.

2. A roller conveyor comprising an elongated frame, a plurality of freely turning rollers mounted along said frame, a plurality of transverse drive rollers journalled on said frame and spaced longitudinally of said frame, there being freely turning rollers between said drive rollers, each drive roller being arranged to frictionally engage an article placed thereon to advance the article along said frame, individual resilient means for intermittently driving each drive roller, and means for intermittently activating said resilient means, each of said resilient means being arranged to be held inactive when a predetermined frictional load is placed on the associated roller.

3. A conveyor comprising a frame, a plurality of rollers mounted on said frame and having their upper surfaces disposed to define an inclined article contacting surface, the inclination of said surface relative to the horizontal being slightly less than the inclination necessary to cause articles disposed on said surface to move downwardly therealong by gravity alone, and means operatively connected to a plurality of said rollers that are longitudinally spaced along said frame for intermittently rotating said spaced rollers in small angular increments and in an angular direction adapted to move articles downwardly along said surface, there being idle rollers in between said plurality of intermittently rotated rollers.

4. A conveyor comprising an inclined frame, a plurality of rollers journalled on said frame in spaced relation, and drive means connected to certain ones of said rollers for intermittently driving said certain rollers to move articles carried by said rollers in a predetermined direction, said certain ones of said rollers being elevated slightly in relation to said other rollers to assure positive frictional engagement between said certain rollers and the articles.

5. A conveyor comprising an inclined frame, a plurality of laterally extending rollers journalled on said frame and spaced apart longitudinally thereof, and drive means connected to certain ones of said spaced rollers for intermittently driving said certain rollers to move articles carried thereby in a predetermined direction, said certain rollers being elevated slightly in relation to the other of said rollers to assure positive frictional engagement between said certain rollers and the articles.

6. A conveyor comprising an inclined frame, a plurality of rollers journalled on said frame and extending laterally with respect thereto and in spaced relation longitudinally thereof, and drive means connected to certain ones of said rollers for intermittently driving said certain rollers to move articles carried by all of said rollers in a predetermined direction, said frame having an inclination less than the inclination necessary to cause articles supported by said rollers to freely gravitate down the conveyor.

7. A conveyor comprising an inclined frame, a plurality of rollers journalled on said frame and extending laterally of said frame and in spaced relation longitudinally thereof to provide a conveying surface, and drive means connected to certain ones of said rollers for intermittently rotating the same in a predetermined direction to advance articles along said conveying surface, said drive means being arranged to permit free rotation of said certain rollers in said predetermined direction by an article moving along said conveying surface when said certain rollers are not being rotated by said drive means.

8. A conveyor comprising a frame, a plurality of rollers journalled on said frame and extending laterally of said frame and in spaced relation longitudinally thereof, one of said rollers being larger in diameter than the other rollers, and driving means connected to certain ones of said rollers and to said large diameter roller for intermittently driving the same to move articles carried by said plurality of rollers in a predetermined direction, said large diameter roller having a peripheral speed greater than the peripheral speed of the certain roller next behind whereby an article in engagement with said large diameter roller will be accelerated away from an article being advanced by said certain roller next behind.

9. A conveyor comprising an inclined frame, a plurality of rollers journalled on said frame and extending laterally with respect thereto and in spaced relation longitudinally thereof, one of said rollers being larger in diameter than the other rollers, and driving means connected to certain ones of said rollers including said large diameter roller for intermittently driving said certain rollers and said large diameter roller and articles carried by said certain rollers and said large diameter roller in a predetermined direction, said certain rollers and said large diameter roller being elevated relative to the remaining ones of said plurality of rollers to assure positive frictional engagement between said certain rollers, said large diameter roller and the articles, and said large diameter roller being arranged to space an article contacted thereby from articles contacted by the certain rollers on the upstream side of said large diameter roller.

10. A conveyor comprising an inclined frame, a plurality of rollers journalled on said frame and extending laterally with respect thereto and in spaced relation longitudinally thereof, one of said rollers being larger in diameter than the other rollers, driving means connected to certain ones of said rollers including said large diameter roller for intermittently driving said certain rollers and said large diameter roller to move articles carried by said driven rollers in a predetermined direction, and article arresting means disposed between said large diameter roller and said certain rollers and arranged to be moved into and out of article arresting position, said large diameter roller having a greater peripheral speed than said certain rollers and being arranged to space an article contacted by said large diameter roller from following articles to allow said article arresting means to move into article arresting position between the article contacted by said large diameter roller and the following articles.

11. A conveyor comprising an inclined frame, a plurality of rollers journalled on said frame and extending laterally with respect thereto and in spaced relation longitudinally thereof, and drive means connected to certain ones of said rollers for intermittently driving said certain rollers to move articles carried by said plurality of rollers in a predetermined direction, the upper surfaces of said certain rollers being elevated at least $\frac{1}{32}$ of an inch and not more $\frac{1}{16}$ of an inch above the surfaces of the other of said plurality of rollers.

12. A holding conveyor for supporting articles comprising an elongated frame having an inlet end and a discharge end, a plurality of article drive rollers journalled in spaced relation on said frame, a plurality of idler rollers journalled on said frame between said spaced drive rollers, individual roller driving means connected to said drive rollers and arranged to intermittently rotate said drive rollers in a predetermined direction to move the articles toward said discharge end, article arresting means adjacent said discharge end to prevent movement of the articles therepast, and means for intermittently driving all of said roller driving means, certain of said individual roller driving means being arranged to be held inactive when an article resting on the drive roller associated therewith is prevented from movement by said arresting means while others of said individual roller driving means remain operative to move articles resting on their associated drive rollers toward said discharge end.

13. A conveyor comprising an inclined frame, a plurality of article drive rollers journalled in spaced relation on said frame, a plurality of idler rollers journalled on said frame between said drive rollers, one of said drive rollers being substantially larger in diameter than the other drive rollers, driving means connected to said drive rollers for intermittently rotating said drive rollers to move articles carried thereby in a predetermined direction, article arresting means disposed between said large diameter drive roller and the preceding drive roller and arranged to be moved between a position for arresting an article advancing on said preceding drive roller and a withdrawn position, said large diameter roller being arranged to space a leading article contacted thereby from a following article to allow said article arresting means to move into article arresting position between the leading article and the following article, and control means connected to said article arresting means and arranged to move said article arresting means to said withdrawn position when no article is in contact with said large diameter drive roller.

14. In a roller conveyor, a frame, a shaft journalled on said frame, a drive roller secured to said shaft for rotation therewith, a ratchet wheel secured on the shaft and having drive teeth, a crank member rotatable on the shaft, a pawl pivotally carried by said crank member and held against said teeth for engagement therewith when said crank member is rotated in one direction, a drive spring connected between said crank member and the frame, said spring being movable from a tensioned position to an untensioned position to rotate said crank and said connected drive roller in said one direction, power actuated means arranged to intermittently rotate said crank member in the opposite direction to move said drive spring to tensioned position, and article arresting means mounted on said frame and movable into and out of article arresting position, said drive spring being of insufficient strength to rotate said drive roller when an article contacting said drive roller is prevented from movement by said arresting means.

15. In a roller conveyor, a frame, a shaft journalled on said frame, a drive roller secured to said shaft for rotation therewith, a ratchet wheel secured on the shaft and having drive teeth, a crank member rotatable on the shaft, a pawl pivotally carried by said crank member and held against said teeth for engagement therewith, a drive spring connected between said crank member and the frame and arranged to move from a tensioned position to an untensioned position to rotate said crank and said connected roller in a predetermined angular direction to advance an article disposed on said drive roller, power actuated means arranged to intermittently rotate said crank member in the opposite angular direction to move said drive spring to tensioned position, and article arresting means mounted on said frame and movable into and out of article arresting position, said crank member being arranged to remain in spring-tensioning position when an article in contact with the associated drive roller is prevented from movement by said arresting means.

16. A conveyor arranged to support an article comprising a frame, a plurality of shafts journalled in spaced relation on said frame, an article drive roller keyed to each shaft and arranged to advance articles supported thereon, a plurality of idler rollers journalled on said frame between adjacent drive rollers, the space between adjacent drive rollers being less than the longitudinal dimension of the surface of an article supported on said adjacent drive rollers, a ratchet wheel secured on each of the shafts and having drive teeth, a crank member mounted for rotation on each shaft and having a yoke on one end thereof, a pawl pivotally carried by each of said crank members, means urging each pawl into engagement with the teeth of the associated ratchet wheel, a drive spring connected between each of said crank members and said frame, a drive rod mounted for reciprocable movement on said frame and movable through each of said yokes, means on said rod disposed in a position to contact each yoke when said rod is moved in one linear direction whereby to rotate the associated crank member in one rotary direction to tension the associated drive spring, said springs being arranged to rotate said crank members in an opposite rotary direction when said rod is moved in an opposite linear direction, and power means for reciprocating said drive rod.

17. A conveyor arranged to support an article comprising a frame, a plurality of shafts journalled in spaced relation on said frame, an article drive roller keyed to each shaft and arranged to advance articles supported thereon, a plurality of idler rollers journalled on said frame between adjacent drive rollers, the space between said drive rollers being less than the longitudinal dimension of the surface of an article supported on said adjacent drive rollers, a ratchet wheel secured on each of the shafts and having drive teeth, a crank member mounted for rotation on each shaft and having a yoke on one end thereof, a pawl pivotally carried by each of said crank members, means urging each pawl into engagement with the teeth of the associated ratchet wheel, a drive spring connected between each of said crank members and the frame, a drive rod mounted for reciprocable movement on said frame and movable through each of said yokes, means on said rod disposed in a position to contact each yoke when said rod is moved in one linear direction whereby to rotate the associated crank member in one rotary direction to tension the associated drive spring, said springs being arranged to rotate said crank members in an opposite rotary direction when said rod is moved in an opposite linear direction, power means for reciprocating said drive rod, and means mounted on said frame and movable into and out of arresting position in front of articles advanced by said drive rollers, the driving force applied by said drive springs to said drive rollers being insufficient to cause movement of the drive rollers when articles supported thereon are held from movement by said arresting means.

18. A conveyor arranged to support an article comprising a frame, a plurality of shafts journalled in spaced relation on said frame, an article drive roller keyed to each shaft and arranged to advance articles supported thereon, a plurality of idler rollers journalled on said frame between adjacent drive rollers, the space between adjacent drive rollers being less than the longitudinal dimension of the surface of an article supported on said adjacent drive rollers, a ratchet wheel secured on each of the shafts and having drive teeth, a crank member mounted for rotation on each shaft and having a yoke on one end thereof, a pawl pivotally carried by each of said crank members, means urging each pawl into engagement with the teeth of the associated ratchet wheel, a drive spring connected between each of said crank members and the frame, a drive rod mounted for reciprocable movement on said frame and movable through each of said yokes, means on said rod disposed in a position to contact each yoke when said rod is moved in one linear direction and to rotate the associated crank member in one rotary direction to tension the associated drive springs, said springs being arranged to rotate said crank members in an opposite rotary direction when said rod is moved in an opposite linear direction, and power means for reciprocating said drive rod, one of said drive rollers being larger in diameter than the other drive rollers and having a peripheral speed greater than the peripheral speeds of the other drive rollers whereby to space the articles driven by said one drive roller from articles driven by the other drive rollers.

19. A conveyor having in combination an article holding section and an article discharge section, said sections having a plurality of juxtaposed transverse rollers defining a conveying surface and drive means connected to certain ones of the rollers in said sections making them driven rollers for intermittently driving said certain rollers and articles carried thereby in a predetermined direction; a driven roller in said discharge section having a diameter larger than that of the driven rollers in said holding section, equal rotation of said driven rollers causing said larger diameter driven roller in said discharge section to advance an article contacted thereby more rapidly than articles contacted by the driven rollers in said holding section are advanced.

20. A conveyor having in combination a plurality of parallel rollers mounted for rotation in juxtaposition to define an elongate conveying surface, drive means connected to certain ones of the rollers for intermittently driving the same and articles carried thereby along said surface in a predetermined direction, an accelerating roller mounted adjacent one end of said conveying surface in position to receive articles therefrom, drive means connected to said accelerating roller and arranged to turn the same to advance articles in said predetermined direction, and article arresting means disposed between said accelerating roller and an adjacent one of said certain rollers and arranged to be moved into and out of article arresting position, said accelerating roller having a greater peripheral speed than said certain rollers and being arranged to space an article contacted by said accelerating roller from a following article contacting the certain roller next behind to allow said article arresting means to move into article arresting position between the article contacting the accelerating roller and said following article.

21. A conveyor comprising a frame, a plurality of rollers journalled on said frame in spaced relation, and spring loaded drive means connected to certain ones of said rollers for intermittently driving said certain rollers to move articles carried by said rollers in a predetermined direction, said certain ones of said rollers being elevated slightly in relation to said other rollers to assure positive frictional engagement between said certain rollers and the articles.

References Cited in the file of this patent

UNITED STATES PATENTS

| | | |
|---|---|---|
| 1,566,611 | Lister | Dec. 22, 1925 |
| 1,716,664 | Prince | June 11, 1929 |
| 2,237,573 | Osborne et al. | Apr. 8, 1941 |